(12) United States Patent
Seppi

(10) Patent No.: US 11,122,723 B2
(45) Date of Patent: Sep. 21, 2021

(54) TOOL ON A TOOL CARRIER FOR TILLING AND COMMINUTING

(71) Applicant: SEPPI M. SPA AG, Caldaro (IT)

(72) Inventor: Lorenz Seppi, Caldaro (IT)

(73) Assignee: SEPPI M. SPA AG, Caldaro (IT)

( * ) Notice: Subject to any disclaimer, the term of this patent is extended or adjusted under 35 U.S.C. 154(b) by 152 days.

(21) Appl. No.: 16/332,090

(22) PCT Filed: Sep. 13, 2017

(86) PCT No.: PCT/EP2017/072991
§ 371 (c)(1),
(2) Date: Mar. 11, 2019

(87) PCT Pub. No.: WO2018/054733
PCT Pub. Date: Mar. 29, 2018

(65) Prior Publication Data
US 2019/0223368 A1    Jul. 25, 2019

(30) Foreign Application Priority Data

Sep. 21, 2016   (IT) .......................... 102016000094638

(51) Int. Cl.
*A01B 33/10* (2006.01)
*B02C 13/06* (2006.01)
*B02C 18/18* (2006.01)

(52) U.S. Cl.
CPC ............ *A01B 33/103* (2013.01); *B02C 13/06* (2013.01); *B02C 18/18* (2013.01)

(58) Field of Classification Search
CPC ..... A01B 33/02; A01B 33/021; A01B 33/103; A01B 33/14; A01B 33/142; A01B 33/16;
(Continued)

(56) References Cited

U.S. PATENT DOCUMENTS

| 3,608,841 A | 9/1971 | Wageneder |
| 4,714,207 A * | 12/1987 | Schrodl ............... B02C 13/2804 241/189.1 |

(Continued)

FOREIGN PATENT DOCUMENTS

| DE | 3545708 A1 * | 6/1987 | ......... B02C 13/2804 |
| DE | 200 21 216 U1 | 3/2001 | |

(Continued)

OTHER PUBLICATIONS

International Search Report, dated Dec. 18, 2017.

*Primary Examiner* — Thomas B Will
*Assistant Examiner* — Ian A Normile
(74) *Attorney, Agent, or Firm* — Jacobson Holman PLLC

(57) ABSTRACT

A tool for tilling and comminuting in a tool carrier with rotor which is rotatable about the rotor axis, the tool is received in a receptacle of the tool carrier arranged on the rotor. The receptacle is formed by a first face provided in the cutting direction and second face on which the tool is fastened by means of its face which faces away from the cutting direction, the tool has a body which has an end face in the direction of rotation of the rotor and a rear face opposite the end face. The rear face is inclined by 1° to 10° with respect to the end face and the tool is braced and held between the face in the cutting direction of the receptacle and the face of the receptacle that faces away from the cutting direction, play is left between the tool and receptacle base.

4 Claims, 4 Drawing Sheets

(58) Field of Classification Search
CPC ......... A01B 29/04; A01B 35/28; A01B 37/00; A01B 39/22; B02C 13/06; B02C 13/28; B02C 13/2804; B02C 18/18
See application file for complete search history.

(56) References Cited

U.S. PATENT DOCUMENTS

| | | | |
|---|---|---|---|
| 2005/0001084 A1* | 1/2005 | Pizzuto | B02C 18/18 241/294 |
| 2006/0226270 A1* | 10/2006 | Kammerer | B02C 13/2804 241/197 |
| 2013/0112792 A1* | 5/2013 | Doppstadt | B02C 18/18 241/282.1 |
| 2013/0214076 A1* | 8/2013 | Zinniger | B27L 11/005 241/294 |
| 2015/0165442 A1* | 6/2015 | Dobrovosky | B02C 13/20 241/222 |
| 2017/0079219 A1* | 3/2017 | Stanley | B02C 18/145 |

FOREIGN PATENT DOCUMENTS

DE 10 2013 110 289 A1 3/2015
EP 1 693 110 A1 8/2006

* cited by examiner

TOOL ON A TOOL CARRIER FOR TILLING AND COMMINUTING

BACKGROUND OF THE INVENTION

The present invention relates to a tool located in a tool holder.

Such tools are exposed to a high wear and stresses that might eventually break and deform the tool.

Generally, two types of tool holders for mulchers and/or grinders are known. The first type has a bearing surface upon which the tool is fastened with its surface that faces away from the cutting direction, for example by means of a bolt. This type of tool holder is known, for example, from DE 2013 110289 A1. This type of tool holder has the drawback that the tool is exposed with his entire body to impacts and damage in the cutting direction.

A second type of tool holder has a seat for receiving the tool, which is formed by a first surface disposed in the cutting direction and a second surface upon which the tool is fastened with its surface that faces away from the cutting direction. A tool holder of this type is known, for example, from EP 1,693,110. With this type of seat, the tool is introduced into the seat to rest upon the bottom of the seat and be later fastened thereto by means of a bolt. A clearance exists between the tool and the front and rear surfaces for the tool to be received therein. This clearance causes increased stresses and wear for the tool.

An additional key factor for tool wear is the cutting angle.

BRIEF SUMMARY OF THE INVENTION

The object of the present invention is to provide a tool holder that is exposed to reduced wear.

Therefore, a tool for grinders, mulchers and the like is provided, which is arranged in a tool holder for a tool-holder rotor rotating about the axis of the rotor. The tool is received in a tool holder seat arranged on the tool-holder rotor. The seat is formed by a first surface disposed in the cutting direction and a second surface upon which the tool is fastened with its surface that faces away from the cutting direction. The tool has a body with a front surface oriented in the direction of rotation of the rotor, and a rear surface that faces away from the front surface. According to the invention the rear surface is inclined by an angle of 1° to 10° with respect to the front surface. The tool is only clamped and supported between the surface in the cutting direction of the seat and the surface that faces away from the cutting direction of the seat, a clearance being provided between the tool and the bottom of the seat.

Thus, the tool body is clamped between the two surfaces of the seat. Later, it is fastened by means of a bolt. By this arrangement, the tool is not able to move in the cutting direction. With no movement, the tool body is less exposed to wear. The seat wear is also reduced.

Advantageously, the tool seat has a raised central portion upon which the tool, that has a mating recess, may be placed. This facilitates positioning.

The tool is removed by first loosening the bolt that extends through the second surface of the seat, facing away from the direction of rotation, and fastens the tool to the seat. Then the tool head is pressed against the working direction. Thus, the tool will be removed from the seat.

Advantageously, the tool of the invention has a greater width at the cutting end than at the end received in the seat.

In a preferred embodiment, the tool has such a shape that the cutting element is the outermost part of the tool with respect to the seat.

BRIEF DESCRIPTION OF THE DRAWINGS

Further characteristics and details of the invention will be apparent from the claims and from the following description of a preferred non-limiting embodiment as shown in the accompanying drawings, in which:

DETAILED DESCRIPTION OF THE INVENTION

Figure 1:
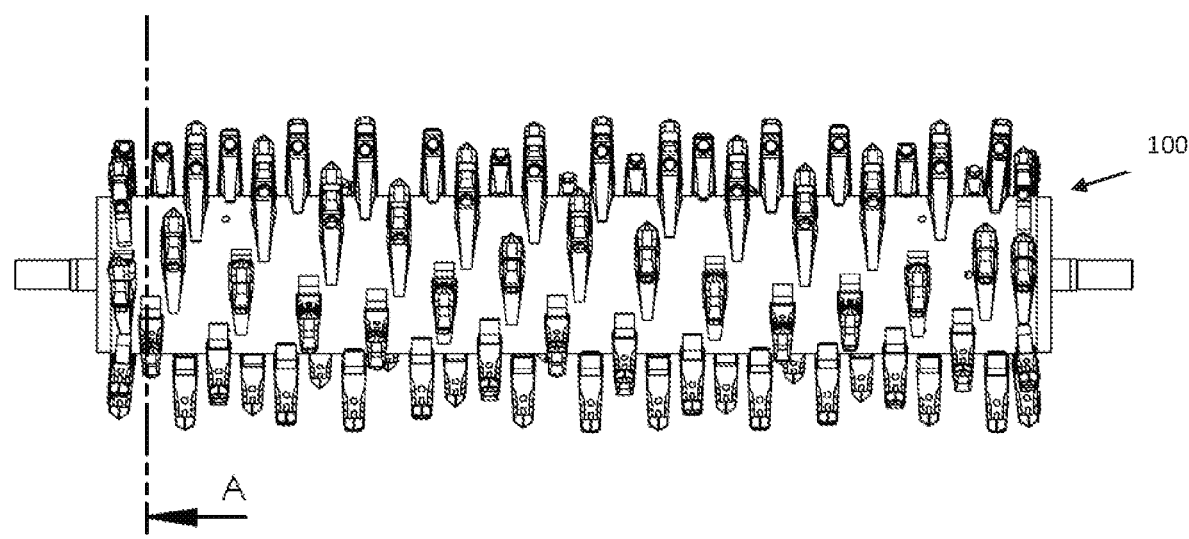
FIG. 1 is a front view of a tool-holder rotor of the invention.
Figure 2:
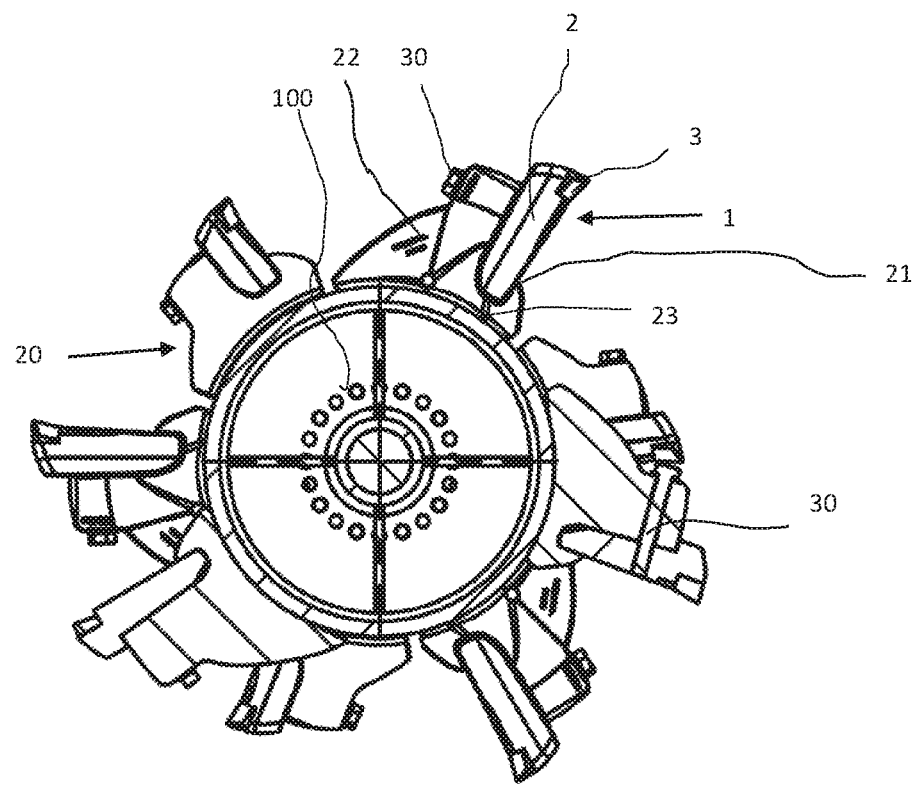
FIG. 2 is a sectional view of a tool-holder rotor of the invention.
Figure 3:
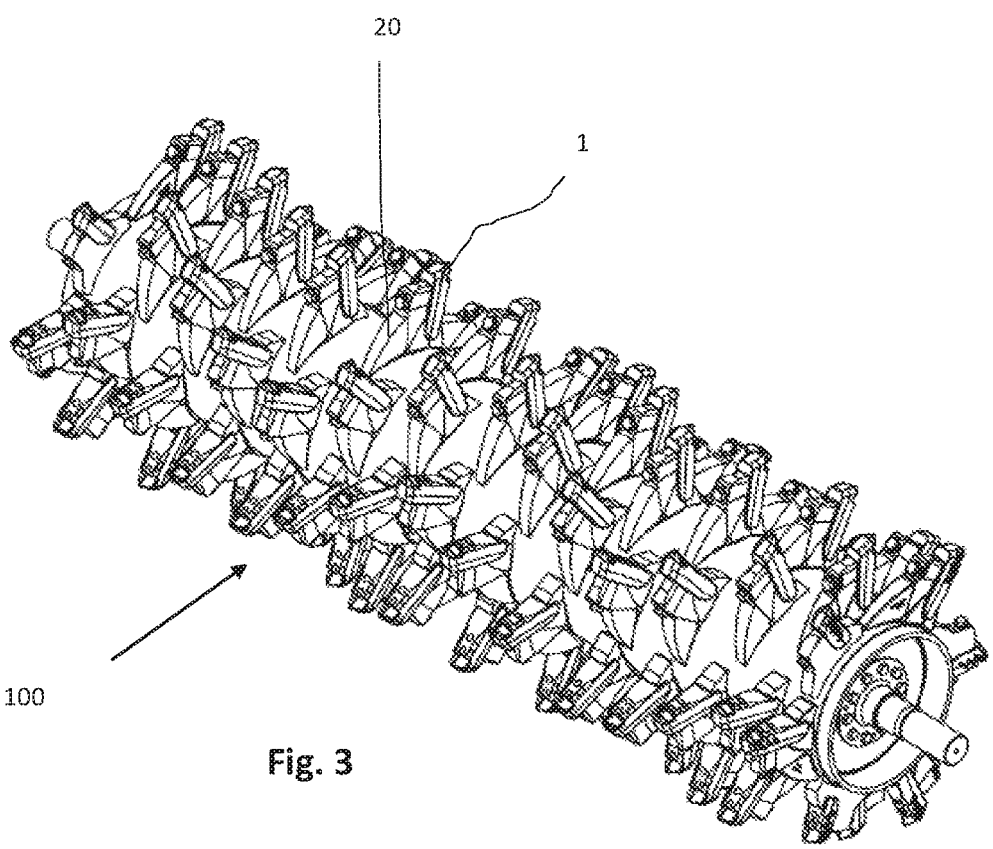
FIG. 3 is a perspective view of a tool-holder rotor of the invention.
Figure 4:
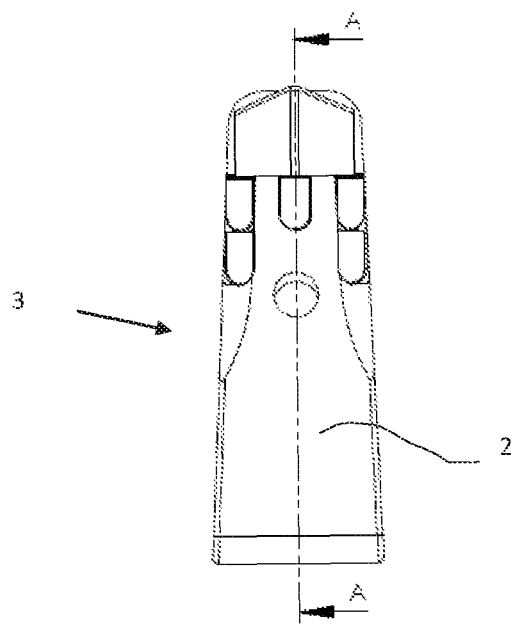
FIG. 4 is a front view of a tool of the invention.
Figure 5:
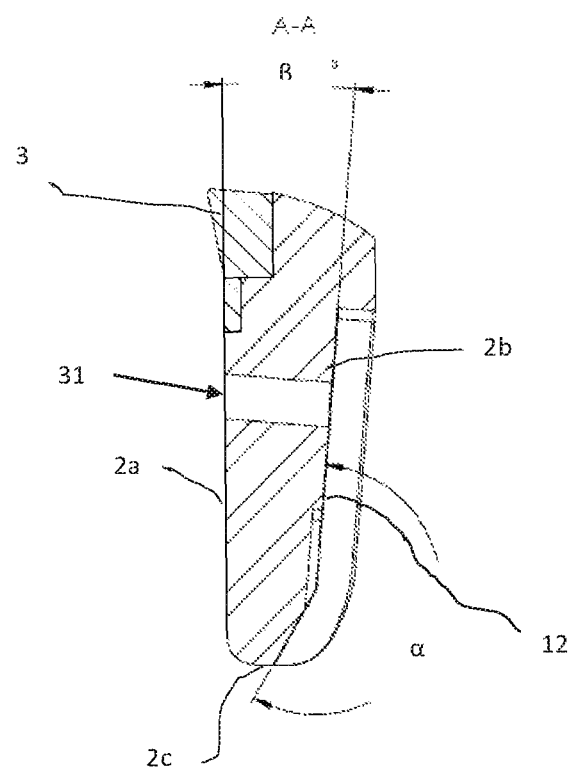
FIG. 5 is a cross-sectional view along A-A of FIG. 4 of a tool of the invention.

In FIG. 1 a tool-holder rotor is designated by numeral 100. Tool holders 20 are arranged on the tool-holder rotor 100. Each tool holder 20 forms a seat for a tool 1. The tool holder 20 is composed of a front portion 21 in the working direction, a lower portion 23 and a rear portion 22 including a through hole for a bolt 30.

The tool 1 for grinders, mulchers and the like, is arranged in a tool holder 20 for a tool-holder rotor 100 rotating about the axis of the rotor. This tool 1 is received in a seat of the tool holder 20 on the tool-holder rotor 100. The tool holder 20 is formed by a front portion 21 disposed in the cutting direction and a rear portion 22 upon which the tool is fastened with its surface that faces away from the cutting direction. The tool 1 has a body 2 with a front surface 2a oriented in the direction of rotation of the rotor, and a rear surface 2b that faces away from the front surface 2a.

According to the invention, the rear surface 2b is inclined by an angle of 1° to 10° with respect to the front surface 2a.

This means that the angle $\beta$ ranges from 1° to 10°.

The tool 1 is only clamped and supported between the front portion 21 oriented in the cutting direction of the seat and the rear portion 22 that faces away from the cutting direction of the tool 1, a clearance being left between the tool and the bottom of the lower portion 23.

The tool is fastened at its top by means of a bolt 30 that extends through the tool holder 20 in the rear portion 22 and is tightened in the hole 31 of the tool.

Advantageously, the tool 1 has a recess on its rear surface 2b. This recess is formed by a first upper portion substantially parallel to the rear surface of the tool and a second lower portion which is inclined toward the front surface by an angle of 10° to 90°, therefore, the angle $\alpha$ ranges from 190° to 270°. This facilitates removal, as a backward rotation of the lower portion of the tool can occur when the back of the tool head is loaded with a force applied opposite to the direction of rotation of the tool.

Furthermore, the central recess is complementary to a raised portion on the rear surface of the rear portion 22. This affords easier and more accurate positioning.

The tool and the seat are made of steel and the cutting edge 3 is preferably made of special steel.

The bolt 30 for fastening the tool is preferably introduced from the back in the tool holder seat. This avoids exposure of the bolt head to processing wear, which might hinder its removal.

Figure 6:
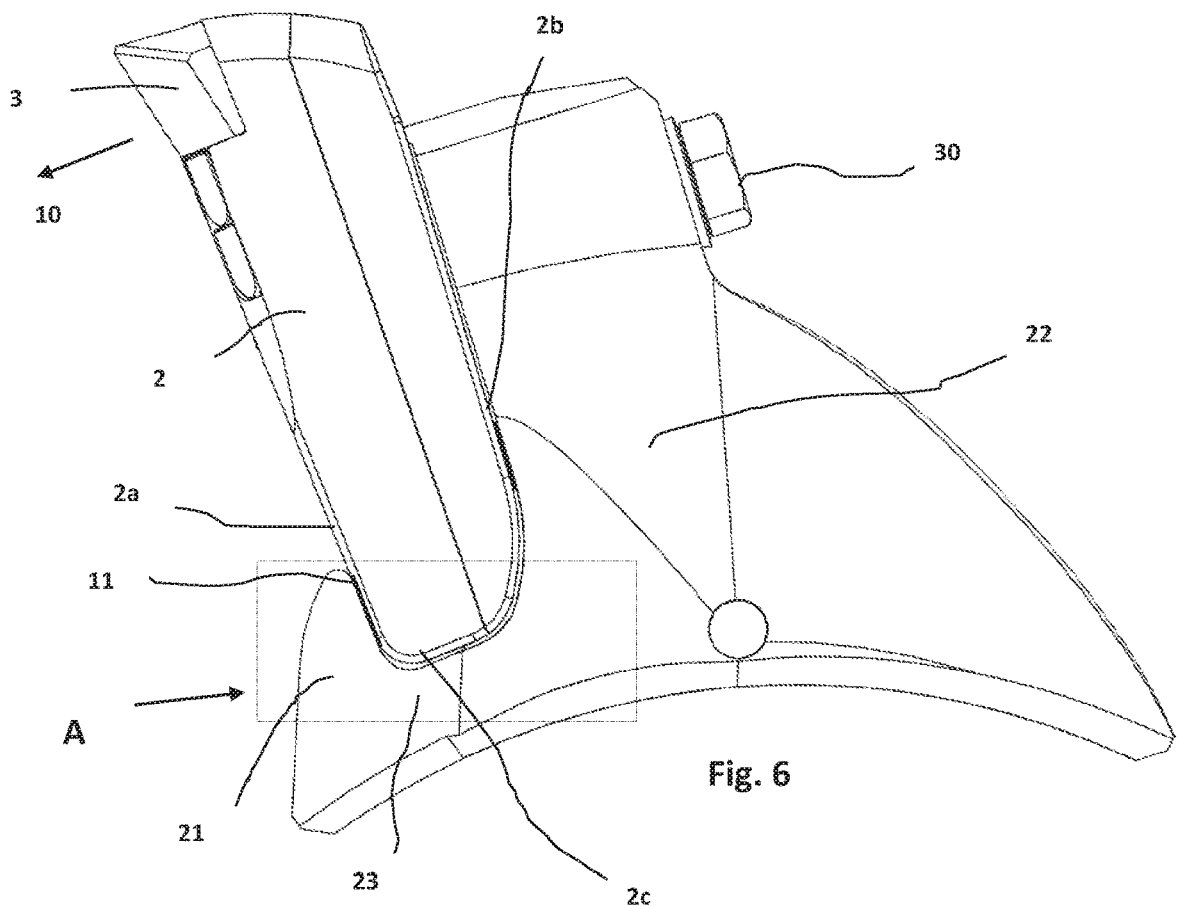
FIG. 6 is an enlarged view of a tool received in in a tool holder.
Figure 7:
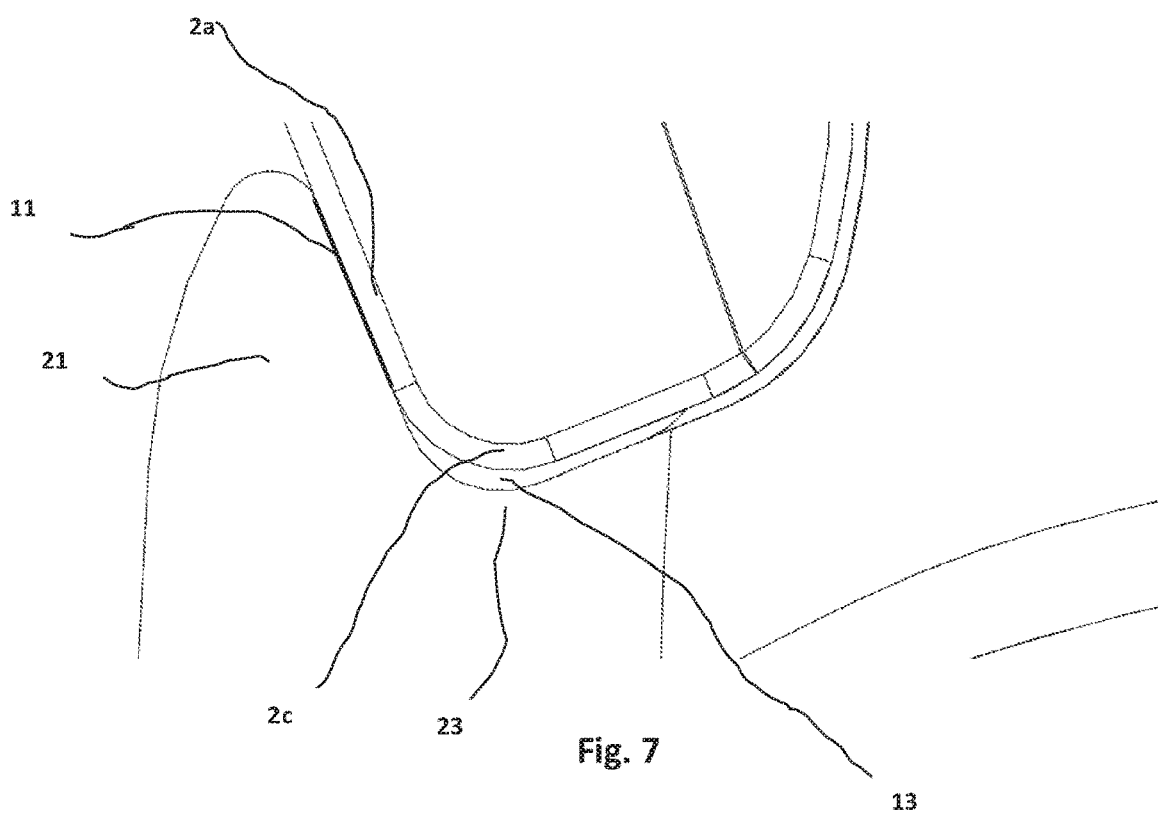
FIG. 7 is a magnified view A of FIG. 6.

FIG. 6 shows a tool holder 20 with a tool 1 received therein. The cutting direction 10 is designated by arrow. The tool 1 is clamped in the tool holder 20 at the contact area 11 between the front portion of the tool holder 21 and the front surface of the tool 2a, at the contact area 12, between the rear portion 22 of the tool holder and the rear surface 2b of the tool, with a clearance 13 being left between the lower surface 2c of the tool and the lower portion 23 of the tool holder.

By this arrangement, as discussed above, the tool will not move in the working direction because it is also locked by the bolt 30, which prevents wear of the tool holder 20 and the bolt 30.

The tool is released by removing the bolt and hitting the back of the tool 1 in the working direction 10.

It will be finally appreciated that the tool and tool holder as described heretofore are susceptible of additions, changes or variants that would be obvious to the skilled person, without departing from the scope of the invention as defined by the appended claims.

LIST OF REFERENCE NUMBERS

1 tool
2 tool body
2a front surface of the tool in the cutting direction
2b rear surface of the tool in the cutting direction
2c lower surface of the tool
3 cutting edge
10 cutting direction
11 contact area
12 contact area
13 clearance
20 tool holder
21 front portion of the tool holder
22 rear portion of the tool holder
23 lower portion of the tool holder
30 bolt
31 bolt hole in the tool body
100 rotor
$\alpha$ angle of the rear surface of the tool
$\beta$ angle between the front and rear surfaces of the tool

The invention claimed is:

1. A tool for grinders and mulchers arranged in a tool holder for a tool holder rotor rotatable about an axis of the tool holder rotor; the tool being housed in a single seat of the tool holder arranged on the tool holder rotor; the single seat being formed by a front portion of the tool holder provided in a cutting direction and a rear surface portion of the tool holder onto which the tool is fixed; the front portion of the tool holder contacts only a small bottom surface portion of the tool whereas the rear surface portion of the tool holder contacts a large surface portion of the tool; a surface area of the large surface portion of the tool contacted by the rear surface portion of the tool holder being many times larger than a surface area of the small bottom surface portion of the tool contacted by the front portion of the tool holder; the tool is supported exclusively between a small bottom surface portion of the front portion of the tool holder in the cutting direction of the single seat and the rear surface portion of the tool holder; a single mechanism allowing easy removal of the tool from the tool holder; the tool having a body which has a front surface in the cutting direction of the tool holder rotor contacted only by the small bottom surface portion of the front portion of the tool holder, and a rear surface opposite the front surface of the body, wherein the rear surface is inclined in the range of 1° to 10° with respect to the front surface; the tool is fitted and supported between the front portion of the tool holder in the cutting direction of the single seat and the rear surface portion of the tool holder; and a clearance exists between the tool and a bottom of the single seat.

2. The tool according to claim 1, wherein the rear surface of the tool has a recess and this recess comprises an upper part and a lower part inclined 10°-90° from the upper part in the direction of the front surface of the tool.

3. The tool according to claim 1, wherein the rear surface of the tool has a recess and this recess is formed by a first upper part substantially parallel to the rear surface of the tool and a second lower part which is inclined 10° to 90° from the first upper part in the direction of the front surface of the tool.

4. The tool according to claim 1 wherein the single mechanism is a bolt through an upper part of the tool holder.

* * * * *